US011262964B2

(12) United States Patent
Liang et al.

(10) Patent No.: US 11,262,964 B2
(45) Date of Patent: Mar. 1, 2022

(54) TECHNIQUES FOR SEAMLESS TRANSITION BETWEEN HOST DISPLAY AND REMOTE DISPLAY

(71) Applicant: ATI Technologies ULC, Markham (CA)

(72) Inventors: Wei Liang, Markham (CA); Jun Lei, Markham (CA); Patrick Pak Kin Fok, Markham (CA); Panagiotis Vagiakos, Markham (CA); Aric Cyr, Markham (CA); Min Zhang, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/176,913

(22) Filed: Oct. 31, 2018

(65) Prior Publication Data

US 2020/0133608 A1 Apr. 30, 2020

(51) Int. Cl.
*G06F 3/14* (2006.01)
*G09G 5/12* (2006.01)

(52) U.S. Cl.
CPC .......... *G06F 3/1423* (2013.01); *G06F 3/1454* (2013.01); *G09G 5/12* (2013.01)

(58) Field of Classification Search
CPC ........ G06F 3/1423; G06F 3/1454; G06F 3/14; G09G 5/12; G09G 2330/021
See application file for complete search history.

(56) References Cited

U.S. PATENT DOCUMENTS

| | | | | |
|---|---|---|---|---|
| 2010/0321395 | A1* | 12/2010 | Maciesowicz | ............ G06F 3/14 345/502 |
| 2015/0356773 | A1* | 12/2015 | Kumar | ................ G06F 9/45558 345/520 |
| 2016/0246278 | A1* | 8/2016 | Tan | ....................... G05B 19/056 |

OTHER PUBLICATIONS https://superuser.com/questions/947291/can-a-fake-second-display-be-enabled-in-windows-10 (retrieved Oct. 31, 2018).
https://superuser.com/questions/62051/is-there-a-way-to-fake-a-dual-second-monitor (retrieved Oct. 31, 2018).
http://www.ishadow.com/?tabid=115&doing_wp_cron=1535566446. 0768599510192871093750 (retrieved Oct. 31, 2018).
https://superuser.com/questions/440148/teamviewer-without-showing-the-screen/705663 (retrieved Oct. 31, 2018).

\* cited by examiner

*Primary Examiner* — David D Davis
(74) *Attorney, Agent, or Firm* — Volpe Koenig

(57) ABSTRACT

Described herein are techniques for removing control of a display from an operating system. The disclosed techniques decouple operation of the physical display device from control of the operating system so that the display device may be powered down while not needed during streaming. The device driver for the graphics card, into which a display device cable is plugged, simulates operation of the display but allows the display to be powered down. Simulating the display involves properly responding to queries or commands from the operating system, and generating the signals that would be expected from the display device by the operating system. While simulated in this manner, whether the display device is actually powered down does not matter (Continued)

to the operation of an application being streamed, because the operating system still "believes" the display device is powered on. Thus application streaming is not interrupted by powering down the display device.

17 Claims, 5 Drawing Sheets

TECHNIQUES FOR SEAMLESS TRANSITION BETWEEN HOST DISPLAY AND REMOTE DISPLAY

BACKGROUND

Personal video game streaming allows a traditional computer system such as a desktop or laptop computer with a discrete 3D graphics processing adapter to be controlled by a remote terminal such as a tablet or smart phone. The traditional computer system starts applications, renders graphics, and transmits the rendered graphics as video to the remote terminal. The remote terminal accepts local inputs and provides the inputs to the traditional computer to operate the application. In this manner, the user experiences functionality of the application through the remote terminal.

SUMMARY

Described herein are techniques for removing control of a display from an operating system, according to examples. Application streaming, such as to an in-home tablet, from an in-home desktop or laptop computer, is increasingly popular. However, execution of the application is still tied to the presence, state, and configuration of a physical display device. Thus while streaming, if the display device is powered down, application streaming could be interrupted because the operating system generally performs certain tasks upon detecting a change in display configuration.

The disclosed techniques decouple operation of the physical display device from control of the operating system so that the display device may be powered down while not needed during streaming (e.g., due to the device to which streaming occurs serving as a display). The device driver for the graphics card, into which a display device cable is plugged, simulates operation of the display but allows the display to be powered down. Simulating the display involves properly responding to queries or commands from the operating system, and generating the signals that would be expected from the display device by the operating system (such as vertical synchronization or "VSYNC" signals). While simulated in this manner, whether the display device is actually powered down does not matter to the operation of an application being streamed, because the operating system still "believes" the display device to be powered on. Thus application streaming is not interrupted by powering down the display device.

BRIEF DESCRIPTION OF THE DRAWINGS

A more detailed understanding may be had from the following description, given by way of example in conjunction with the accompanying drawings wherein.

DETAILED DESCRIPTION

Described herein are techniques for removing control of a display from an operating system, according to examples. Application streaming, such as to an in-home tablet, from an in-home desktop or laptop computer, is increasingly popular. However, execution of the application is still tied to the presence, state, and configuration of a physical display device. Thus while streaming, if the display device is powered down, application streaming could be interrupted because the operating system generally performs certain tasks upon detecting a change in display configuration.

The disclosed techniques decouple operation of the physical display device from control of the operating system so that the display device may be powered down while not needed during streaming (e.g., due to the device to which streaming occurs serving as a display). The device driver for the graphics card, into which a display device cable is plugged, simulates operation of the display but allows the display to be powered down. Simulating the display involves properly responding to queries or commands from the operating system, and generating the signals that would be expected from the display device by the operating system (such as vertical synchronization or "VSYNC" signals). While simulated in this manner, whether the display device is actually powered down does not matter to the operation of an application being streamed, because the operating system still "believes" the display device to be powered on. Thus application streaming is not interrupted by powering down the display device.

Figure 1:
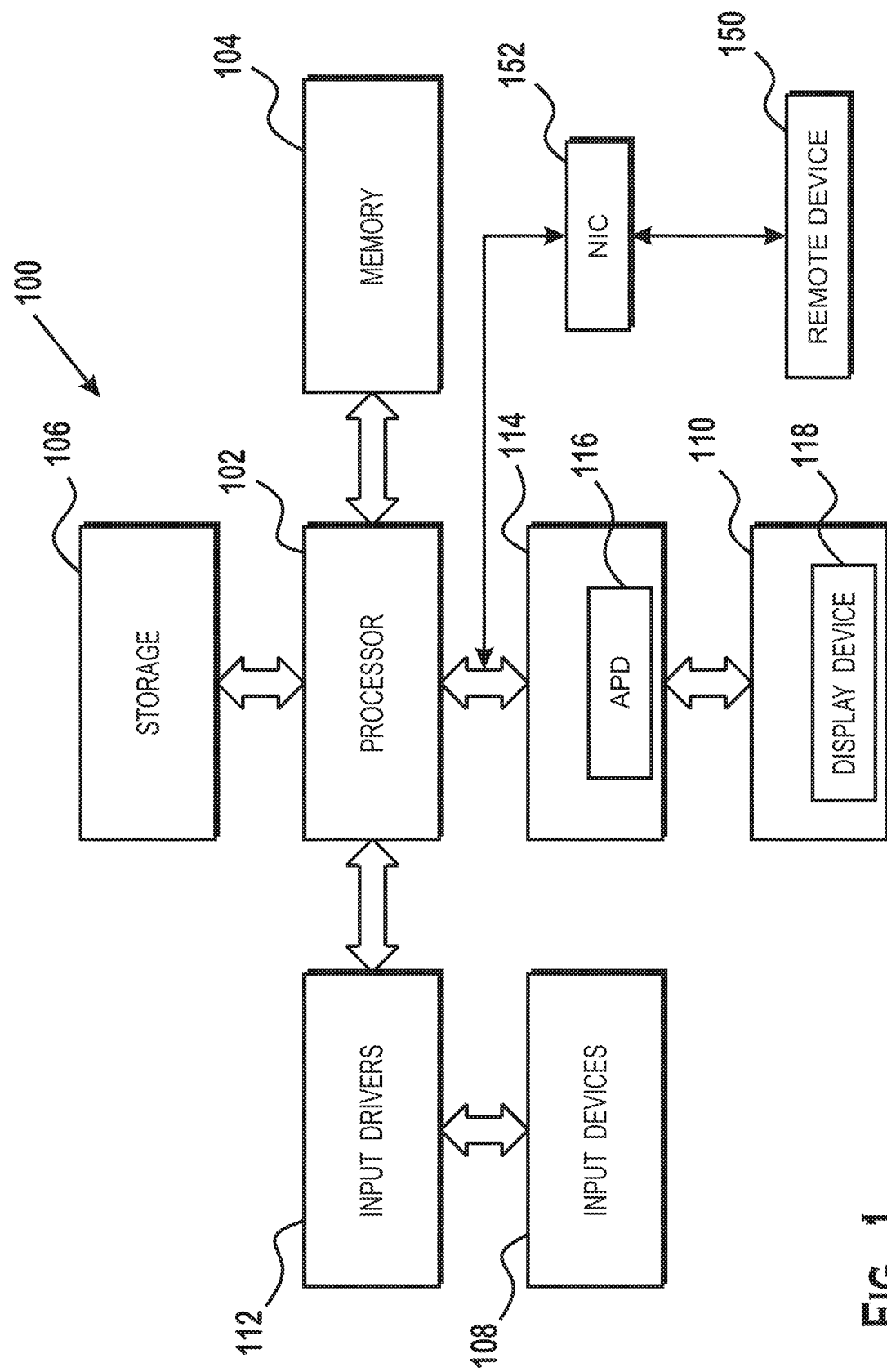
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. Via an included rendering engine, the APD 116 is configured to accept compute commands and graphics rendering commands from processor 102, to process those compute and graphics rendering commands, and to provide pixel output to display device 118 for display.

A network interface controller "NIC 152" is included within the device 100. The device 100 accesses external computing systems, such as the remote device 150, via the NIC 152. In one example, the device 100 is a desktop computer and the remote device 150 is a tablet computer. The device 100 performs application streaming using the APD 116, NIC 152, and remote device 150. More specifically, the device 100 executes an application that generates graphics via the APD 116, which is transmitted via the NIC 152 to the remote device 150. The device 100 also receives input (such as mouse clicks and keyboard and/or game pad presses) from the remote device 150 and applies that input to the application. The above capability allows for remote application use, such as playing games on a tablet that use the 3D rendering capabilities of the APD 116 on the device 100.

Figure 2:
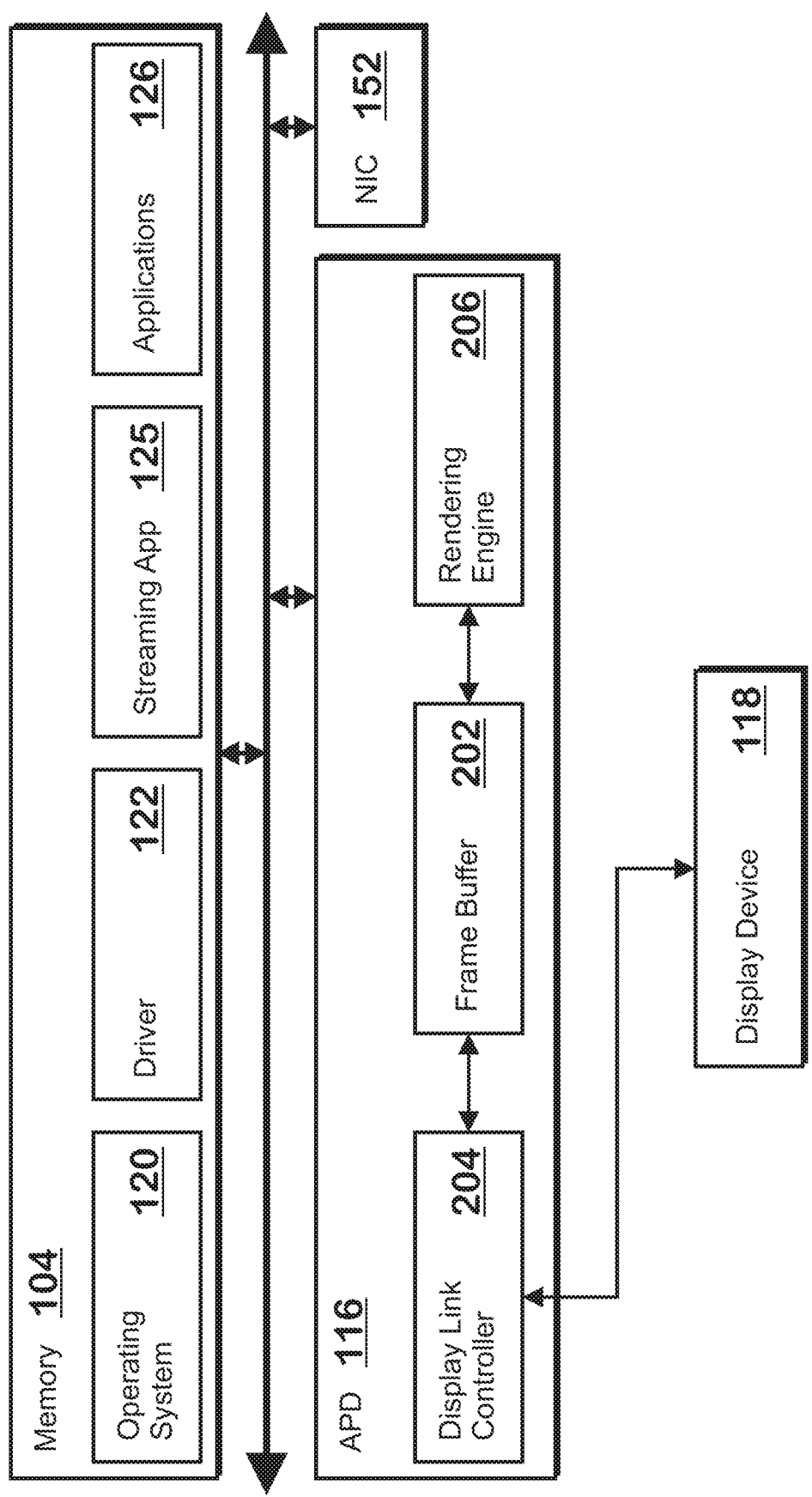
FIG. 2 is a block diagram of the device, illustrating additional details related to remote application streaming, according to an example.

FIG. 2 is a block diagram of the device 100, illustrating additional details related to remote application streaming, according to an example. The processor 102 maintains, in system memory 104, one or more control logic modules for execution by the processor 102. The control logic modules include an operating system 120, a driver 122, a streaming app 125, and applications 126. These control logic modules control various features of the operation of the processor 102, the APD 116, and other components. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by the rendering engine 206 of the APD 116. In other implementations, no just-in-time compiler is used to compile the programs, and an offline (i.e., not just-in-time) compiler compiles shader programs for execution on the APD 116.

In general, the APD 116 accepts commands to render 3D graphics from one or more applications 126, and processes those commands to generate pixels for display on the display device 118. Specifically, the APD 116 includes a rendering engine 206 that processes the commands from the one or more applications 126 and writes pixel data to the frame buffer 202, which is a buffer in memory (e.g., memory of the APD 116). In various examples, the rendering engine includes a 3D pipeline that processes 3D commands and produces the pixel data. In an example, the 3D pipeline includes fixed function and programmable hardware units that process the 3D commands according to one or more common 3D processing pipelines (such as Microsoft's DirectX 9, 10, 11, or 12 pipelines, the OpenGL pipeline, or other 3D processing pipelines).

The display link controller 204 reads the contents of the frame buffer 202 and outputs those contents to update the image shown on the display device 118. In addition, the display link controller 204 also controls power and display configuration options for the display device 118. Specifically, the display link controller 204 issues power commands to the display device 118 that cause the display device 118 to change power state. Different power states include a fully powered on state, in which the display link controller 204 is transmitting pixel data each frame and the display device 118 is displaying that pixel data, an "active-off" state in which the display device 118 is not showing an image and the display link controller 204 is not transmitting pixel data to the display device 118 but the display link controller 204 and the display device 118 maintain power to the communicative connection therebetween, and a "fully off" state in which the communicative link between the display link controller 204 and the display device 118 is powered down and the display device 118 is powered off or not physically connected to the APD 116. In an example, power state is changed at the request of an operating system 120.

The display link controller 204 also receives configuration information from the display device 118, such as available resolutions and display refresh rates, and receives vertical sync signals from the display device 118. Vertical sync (or "VSYNC") signals are generated by displays 118 after a frame has been updated on the display 118. Software in the device 100, such as the operating system 120 and/or applications 126, uses the VSYNC signals to synchronize with the display, to prevent issues such as screen tearing. The display link controller 204 also sends configuration change requests to the display device 118 (e.g., at the request of the operating system 120). Configuration change requests are requests to change the resolution, refresh rate, or other configuration aspect of the display device 118.

A streaming app 125 is a custom application that executes on the device 100. The streaming app 125 provides application streaming functionality. In an example, when streaming is enabled, the streaming app 125 causes frames from the frame buffer 202 to be transmitted via the NIC 152 to the remote device 150 for display. In some implementations, the streaming app 125 causes the frames to be encoded using a video codec that, in some implementations, is a part of the APD 116 before being transmitted to the remote device 150.

One issue with the streaming functionality provided by the streaming app 125 is that the state of the display device 118 can affect the user experience when utilizing the streaming functionality via the remote device 150. Specifically, in "standard" operation, the operating system 120 is the entity that has overall control of the aspects of the display link controller 204 described elsewhere herein. More specifically, in "standard" operation, the display link controller 204 and driver 122 act as a pass-through conduit that report communications from the display device 118 (such as configuration information, VSYNC signals, and others) to the operating system 120 and that carry out the requests of the operating system 120 by interfacing with the display device 118. For example, in "standard" operation, if the display device 118 is physically turned off, the display link controller 204 detects this change and reports the change to the operating system 120. In response, the operating system 120 may take steps that interrupt operation of the application that is the source of the streaming graphics. These changes can affect the user experience at the remote device 150, as these changes often cause frame rate reduction. In addition, the various configuration changes caused by powering off the display device 118 may cause the application 126 to crash.

Figure 3:
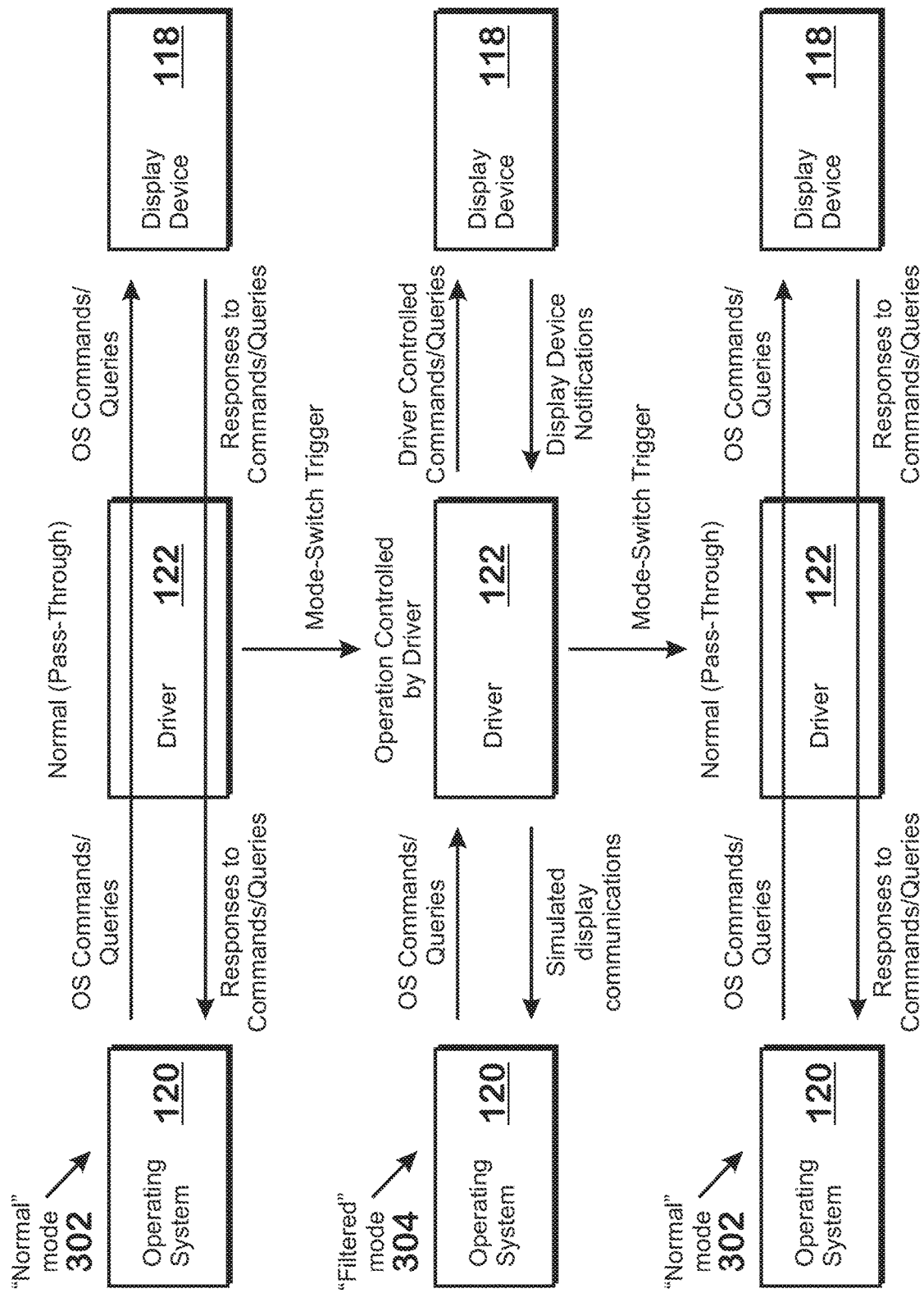
FIGS. 3-5 describe techniques for removing control of a display from an operating system, according to examples.

FIG. 3 illustrates a technique for decoupling control of the display device 118 from the operating system 120 so that actual changes to the display device 118 (such as powering down or causing the display device 118 to sleep) are not necessarily reported to the operating system 120 and thus the application 126 is not interrupted, according to an example. As shown in FIG. 3, the device 100 begins in a "normal mode 302" in which the operating system 120 has control over the display device 118. The driver 122 acts as a simple "pass-through" or translation layer for operating the display device 118. Thus the driver 122 accepts OS commands (e.g., commands to change configuration of the display 118) or queries (e.g., commands to request state or capabilities of the display device 118) and provides those commands or queries to the display device 118 for response. The commands or queries are collectively shown as "OS Commands/Queries" in FIG. 3. The display device 118 executes the commands or responds to the queries. The driver 122 receives responses to the commands or queries from the display device 118 and provides the responses to the operating system 120. The responses to commands and queries are shown as "responses to commands/queries" in FIG. 3. In addition, the display device 118 generates VSYNC signals and the operating system 120 receives those signals.

When a mode-switch trigger occurs, the device 100 changes to a "filtered" mode 304. In an example, the mode-switch triggers occurs when an application 126 that renders graphics via the APD 116 and/or is designated to use the streaming capabilities of the streaming app 125, is started. In another example, a user manually triggers the mode-switch trigger via an interface provided by the streaming app 125. In yet another example, the mode-switch trigger occurs when the streaming app 125 begins streaming to the remote device 150.

In the filtered mode, operation of the display device 118 is controlled by the driver 122. In this mode, the driver 122 hides the true state of the display device 118 from the operating system 120, but still responds to operating system commands or queries as if the device 100 were operating in normal mode. This "hiding" or "filtering" allows the display device 118 to be powered down during operation in the filtered mode 304 without the operating system 120 knowing that the display device 118 is powered down. This operation allows streaming of an application to the remote device 150 while also allowing the display device 118 to be powered down without the interruptions that changing display configuration typically induces in operating system 120 and application 126 operation.

The driver 122 performs a number of tasks to make it appear to the operating system 120 as if the display device 118 is actually operating under control of the operating system 120. These tasks include one or more of the following. The driver 122 caches the state of the display device 118 so that the driver 122 can report that state back to the operating system 120 if the operating system 120 requests that state. The state includes at least current resolution and current frame rate of the display device 118, where "current" means at the time that the filtered mode 304 begins. In an example, the driver 122 enters the filtered mode 304, saves the state of the display device 118 and powers down the display device 118.

Additionally, the driver 122 generates VSYNC signals to be provided to the operating system 120 at the end of every frame. When the display device 118 is powered down, the display device 118 does not actually generate such signals. Thus the VSYNC signals generated by the driver 122 are simulated VSYNC signals. The driver 122 uses the cached frame rate to determine the appropriate timing for generating the VSYNC signals and transmitting those signals to the operating system 120.

The operating system 120 may sometimes request, through the driver 122, certain changes in configuration (e.g., resolution or frame rate) to the display device 118. When in the filtered mode 304, the driver 122 checks the cached capabilities of the display device 118 and, if the display device 118 is able to make the requested change in configuration, reports a success to the operating system 120. The driver 122 also updates the cached state of the display device 118 so that the driver 122 records that the current state of the display device is the state as requested by the operating system 120.

The driver 122 does not transmit notifications from the display device 118 to the operating system 120, at least until after the filtered mode 304 has ended. The notifications that are not transmitted include notifications about changes in power state or any other aspects of operation of the display device 118 that would normally be transmitted to the operating system 120. In an example, a user powers down the display device 118 by pressing a physical on/off button. Normally (i.e., in "normal" mode 302), the display link controller 204 would detect this power-down and transmit a notification of the power down to the driver 122. The driver 122 would then notify the operating system 120 of the new power state of the display device 118. In filtered mode 304, the driver 122 instead does not notify the operating system 120 of the new power state. In some implementations, the driver 122 caches all changes in power state of the display device 118 for eventual transmission to the operating system 120 after returning to normal mode 302.

In some implementations, upon entering filtered mode 304, the driver 122 powers the display device 118 down to a power state in which the screen does not display frames but still listens for commands from the driver/display link controller 204. This power-down occurs regardless of whether the operating system 120 requests the power-down. In other implementations, automatic screen power-down does not occur. If a user shuts off or unplugs the display device 118 in filtered mode 304, the driver 122 simply does not notify the operating system 120 of such an event, continues generating the simulated display communications and transmits those simulated display communications to the operating system 120. In some implementations, whether the driver 122 automatically powers down the display device 118 is controlled by a user-modifiable setting in the streaming app 125.

In FIG. 3, the commands and queries transmitted by the OS 120 to the driver 122 in the filtered mode 304 are shown as "OS Commands/Queries." Driver-controlled commands/queries are shown as being sent from the driver 122 to the display device 118. These include all commands (e.g., power state changes) or queries (e.g., queries regarding current state or capabilities) transmitted by the driver 122 to the display device 118 in the filtered mode 304. The display device notifications include whatever communications the display device 118 provides to the driver 122 in the filtered mode 304, such as notifications regarding power state changes and capabilities. The simulated display communications represent whatever communication is generated by the driver 122 and transmitted to the operating system 120 in the filtered mode 304, such as the simulated VSYNC signals, responses to queries based on cached display device state or capabilities, or any other communications.

The driver 122 returns to normal mode 302 after a mode-switch trigger occurs. In one example, the mode-switch trigger is an application 126 that renders graphics (e.g., a game) shutting down. In another example, a user manually triggers the mode-switch trigger via an interface provided by the streaming app 125. In yet another example, the mode-switch trigger includes the streaming app 125 stopping streaming.

Figure 4:
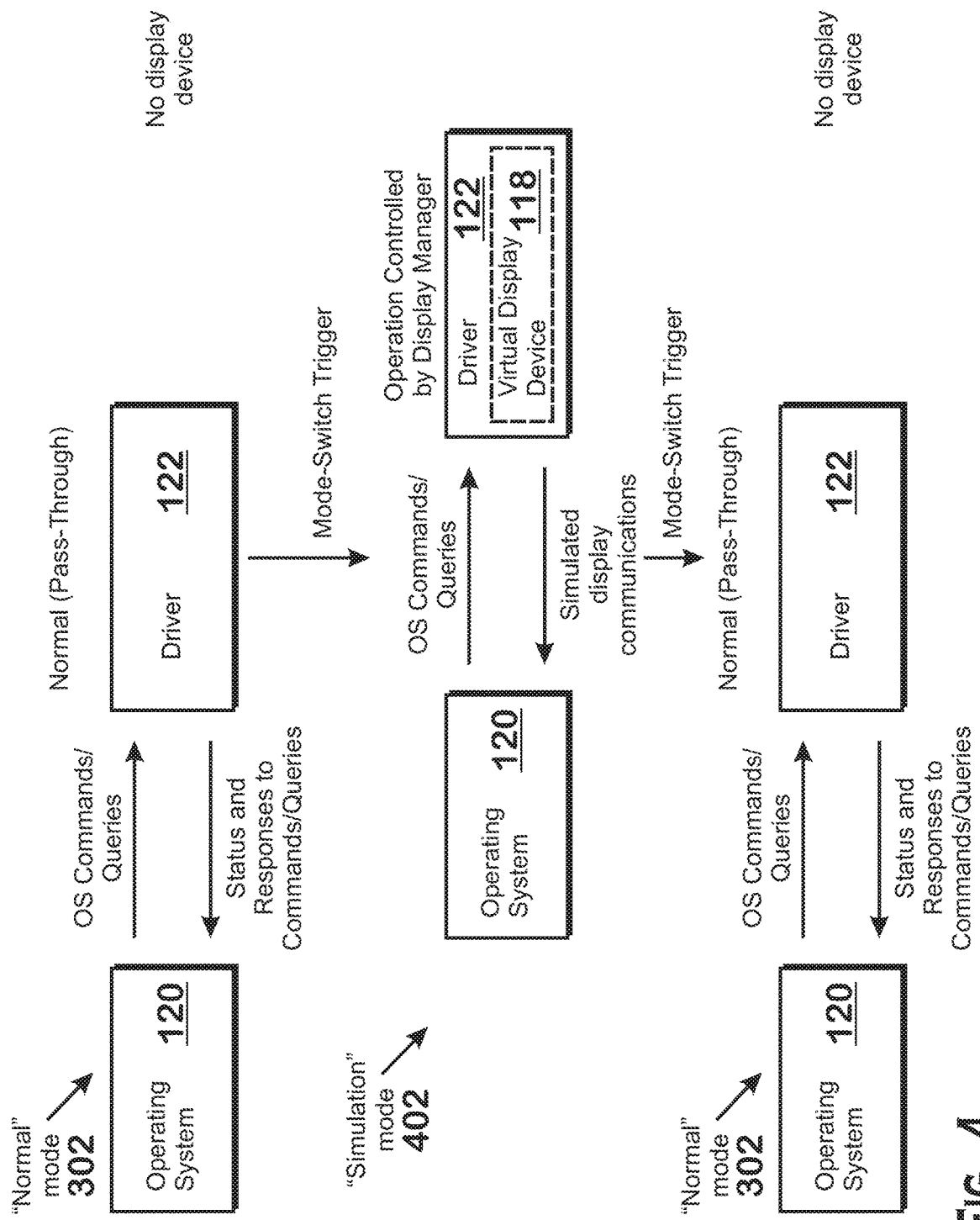

FIG. 4 is an illustration of a technique for operation of the device 100 when a display device 118 is not present.

According to this technique, the device 100 transitions from the normal mode 302 to a simulation mode 402 and then back upon detection of mode-switch triggers, in a similar manner as with respect to the technique of FIG. 3. The difference between the techniques of FIGS. 3 and 4 arises from the fact that in the technique of FIG. 3, a display device 118 actually exists, and thus the simulated display communications generated by the driver 122 are based on actual characteristics of the display device 118 (e.g., cached state and actual, though cached, capabilities of the display device 118). In the technique of FIG. 4, the display state and capabilities are completely simulated. This display state and capabilities are represented in FIG. 4 as the virtual display device 404. As with the technique of FIG. 3, the simulated display communications are based on display device state stored by the driver 122, as opposed to actual information from a display device. However, in contrast with the technique of FIG. 3, in FIG. 4, the driver 122 does not communicate with any display device because none exists. Further, the information described as the cached display device state or capabilities with respect to FIG. 3 is instead the virtual display device 404 of the driver 122 in the technique of FIG. 4.

In the technique of FIG. 4, a driver 122 detects a mode-switch trigger (such as an application that renders graphics using the rendering engine 206 being started or an explicit request by a user to begin streaming by the streaming app 125). In response to the mode-switch trigger, the driver 122 enters the simulation mode 402, in which the driver 122 simulates a display device 404. Initially, the driver 122 informs the operating system 120 that this virtual display device 404 is newly connected, since previously, no such device was connected.

In the simulation mode 402, the driver 122 responds to OS commands/queries in accordance with the virtual display device 404. In an example, the driver 122 responds to requests to change display state (e.g., resolution) by changing the stored state of the virtual display device 404 in accordance to the commands and reporting a success. In another example, the driver 122 responds to OS queries regarding device capabilities by reporting the capabilities (e.g., allowed resolutions and frame rates) of the virtual display device 404. In addition, the driver 122 generates VSYNC signals based on the current state of the virtual display device 404. The simulated display communications include the responses to commands and queries and the generated VSYNC simulated display communications.

Once the second mode-switch trigger is detected, the driver 122 stops simulating a display device and returns control of display device operations to the operating system. The driver 122 also reports the "true" display device state, which is that the device that was previously simulated does not exist. In some implementations, the driver 122 reports this as the previously simulated display device being disconnected. The operating system 120 proceeds in accordance with this new display state.

Figure 5:
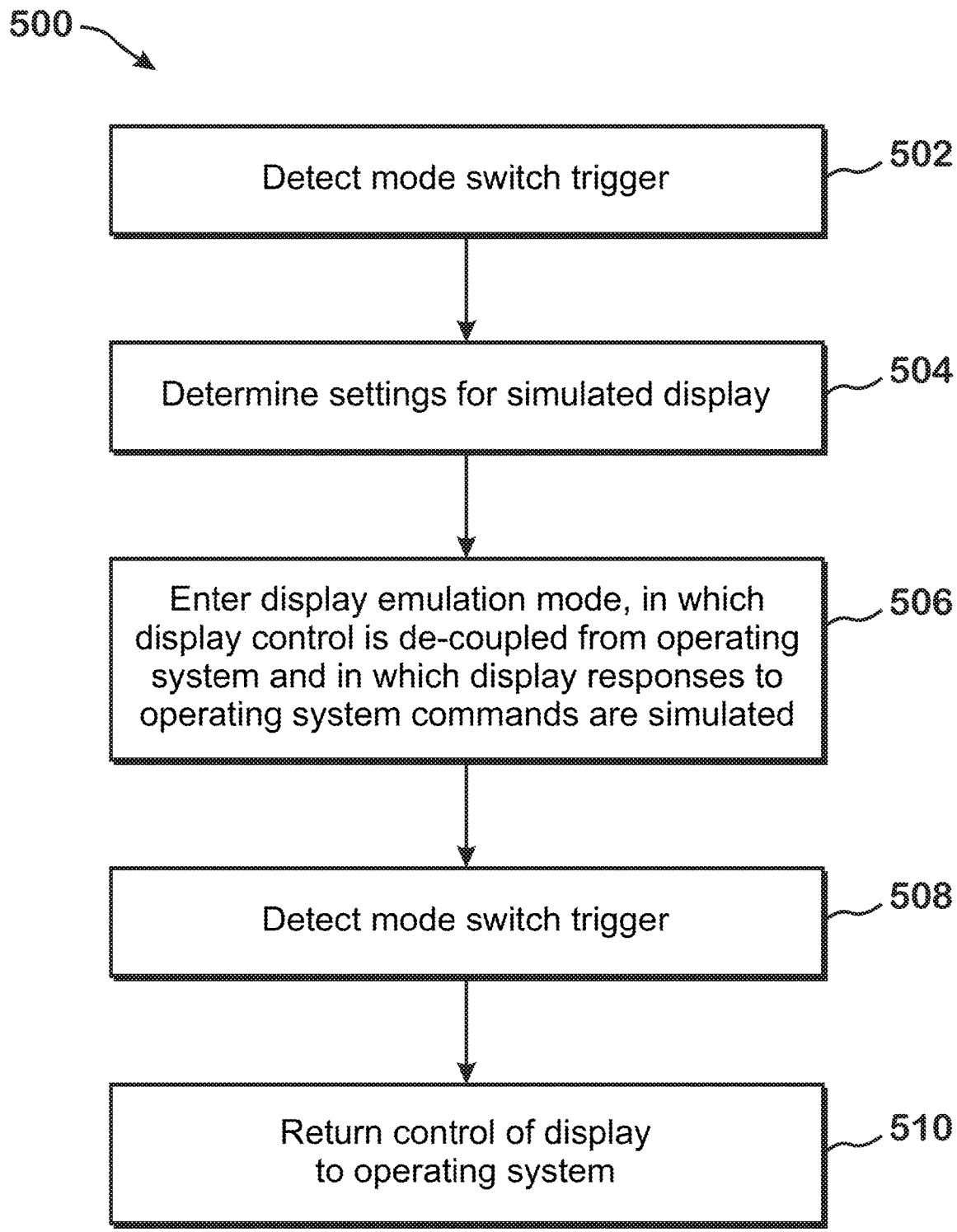

FIG. 5 is a flow diagram of a method 500 for operating according to a display emulation mode, according to an example. Although described with respect to the system of FIGS. 1-4, it should be understood that any system configured to perform the steps of the method 500 in any technically feasible order falls within the scope of the present disclosure. The method 500 generically encompasses both the technique of FIG. 3, in which a display exists but the driver 122 takes over operation of the display upon detecting a trigger, and the technique of FIG. 4, in which no physical display exists and the driver 122 operates a virtual display upon detecting a trigger.

The method 500 begins at step 502, where the driver 122 detects a mode switch trigger. The mode switch trigger includes one of detecting that an application that renders graphics using the graphics engine 206 has been started, detecting an explicit request to decouple operation of the display from the operating system 120 (e.g., by a user, via an interface provided by the streaming app 125), or detecting that the streaming app 125 has begun initialization operations to begin streaming an application to the remote device 150.

At step 504, the driver 122 determines settings for a simulated display. If a physical display exists (as with the technique of FIG. 3), then the driver 122 caches the state and capabilities of that display as the "settings" of the display. If no physical display exists, the driver 122 generates a virtual display device 404 using pre-determined settings. The settings may be hard-coded into the driver 122, modifiable by the streaming app 125, or determined in any other technically feasible manner.

At step 506, the driver 122 enters display emulation mode, in which display control is decoupled from the operating system and in which responses to operating system commands, and other communications, are simulated by the driver 122. As described elsewhere herein, these responses include responses to commands (e.g., commands for changing resolution or frame rate) and queries (e.g., about current state or capabilities) from a display device as well as VSYNC signals. In some implementations, the driver 122 also automatically powers down the physical display device if one exists.

At step 508, the driver 122 detects a mode switch trigger as described elsewhere herein. In various examples, the mode switch trigger includes an application rendering graphics using the rendering engine 206 shutting down, receipt of an explicit command by a user to stop the display simulation mode, or receipt of a notification from the streaming app 125 that streaming has ended.

At step 510, the driver 122 returns control of the display system to the operating system 120. If a physical display actually exists, the driver 122 reports the actual state of the display to the OS. If no physical display exists, the driver 122 reports disconnection of the previously simulated display. The driver 122 resumes operation in the normal mode 302.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing display operations on a device executing an operating system, the method comprising:
    detecting a first mode-switch trigger for entering into a display simulation mode in which a simulated display is simulated;
    responsive to the first mode-switch trigger, determining settings for the simulated display;
    entering the display simulation mode, in which communication with the operating system precludes the operating system from detecting the entry into the display simulation mode; and
    communicating with the operating system regarding display operation according to the simulated display, the communicating including transmitting a vertical synchronization signal to the operating system according to the simulated display.

2. The method of claim 1, wherein a physical display exists and is connected to the device.

3. The method of claim 2, wherein the simulated display includes cached status and capability data of the physical display.

4. The method of claim 1, wherein no physical display is connected to the device.

5. The method of claim 4, wherein the simulated display includes status and capability data for a virtual display.

6. The method of claim 1, further comprising communicating with the operating system regarding display operation according to the simulated display, comprising:
    responding to operating system commands to change display state to newly requested display state by updating data of the simulated display to reflect the newly requested display state.

7. The method of claim 1, further comprising:
    during the display simulation mode, refraining from transmitting power adjustment notifications received from the simulated display to the operating system.

8. The method of claim 1, wherein the first mode-switch trigger comprises one of starting an application whose data is to be streamed, receiving a user request to initiate the display simulation mode, or detecting initiation of application streaming.

9. A device for performing display operations, the device comprising:
    a memory configured to store an operating system and a driver; and
    a processor configured to execute the operating system and the driver,
    wherein when executed, the driver is configured to:
        detect a first mode-switch trigger for entering into a display simulation mode in which a simulated display is simulated;
        responsive to the first mode-switch trigger, determine settings for the simulated display;
        enter the display simulation mode, in which communication with the operating system precludes the operating system from detecting the entry into the display simulation mode; and
        communicate with the operating system regarding display operation according to the simulated display, the communicating including transmitting a vertical synchronization signal to the operating system according to the simulated display.

10. The device of claim 9, wherein a physical display device is connected to the device.

11. The device of claim 10, wherein the simulated display includes cached status and capability data of the physical display.

12. The device of claim 9, wherein no physical display is connected to the device.

13. The device of claim 12, wherein the simulated display includes status and capability data for a virtual display.

14. The device of claim 9, further comprising communicating with the operating system regarding display operation according to the simulated display, comprising:
    responding to operating system commands to change display state to newly requested display state by updating data of the simulated display to reflect the newly requested display state.

15. The device of claim 9, wherein the driver is further configured to:
    during the display simulation mode, refrain from transmitting power adjustment notifications received from the simulated display to the operating system.

16. The device of claim 9, wherein the first mode-switch trigger comprises one of starting an application whose data is to be streamed, receiving a user request to initiate the display simulation mode, or detecting initiation of application streaming.

17. A non-transitory computer-readable medium storing instructions that, when executed by a processor, cause the processor to perform display operations on a device executing an operating system, by:
    detecting a first mode-switch trigger for entering into a display simulation mode in which a simulated display is simulated;
    responsive to the first mode-switch trigger, determining settings for the simulated display;
    entering the display simulation mode, in which communication with the operating system precludes the operating system from detecting the entry into the display simulation mode and
    communicating with the operating system regarding display operation according to the simulated display, the communicating including transmitting a vertical synchronization signal to the operating system according to the simulated display.

* * * * *